United States Patent
Lönn et al.

(10) Patent No.: US 11,898,476 B2
(45) Date of Patent: Feb. 13, 2024

(54) METHOD FOR PREDICTING SOOT BUILD-UP IN AN ENGINE SYSTEM

(71) Applicant: VOLVO PENTA CORPORATION, Gothenburg (SE)

(72) Inventors: Nina Lönn, Torslanda (SE); Arlena Amiri, Gothenburg (SE); Viktor Palmqvist Berntsson, Gothenburg (SE); Jakob Heide, Gothenburg (SE); Johan Assiks, Hindås (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 0 days.

(21) Appl. No.: 18/047,203

(22) Filed: Oct. 17, 2022

(65) Prior Publication Data

US 2023/0121134 A1 Apr. 20, 2023

(30) Foreign Application Priority Data

Oct. 19, 2021 (EP) .................................... 21203411

(51) Int. Cl.
*F01N 11/00* (2006.01)
*G01M 15/04* (2006.01)
*G01M 15/05* (2006.01)

(52) U.S. Cl.
CPC ......... *F01N 11/002* (2013.01); *G01M 15/048* (2013.01); *G01M 15/05* (2013.01); *F01N 2550/04* (2013.01)

(58) Field of Classification Search
CPC .............. F01N 11/002; F01N 2250/04; G01M 15/048; G01M 15/05
See application file for complete search history.

(56) References Cited

U.S. PATENT DOCUMENTS

2003/0051696 A1* 3/2003 Berndorfer ............ F01M 11/10
123/196 R
2010/0126144 A1* 5/2010 He ...................... F01N 13/0097
60/286

(Continued)

FOREIGN PATENT DOCUMENTS

DE 102013008426 A1 11/2014
EP 2423477 A1 2/2012
WO 2016184497 A1 11/2016

OTHER PUBLICATIONS

Extended European Search Report in corresponding European Application No. 21203411.0 dated Mar. 18, 2022 (6 pages).

*Primary Examiner* — Eric S. McCall
(74) *Attorney, Agent, or Firm* — Venable LLP; Jeffri A. Kaminski

(57) ABSTRACT

A method for predicting soot build-up in an engine system when operating according to an intended drive cycle. The engine system includes an internal combustion engine and an exhaust gas aftertreatment system provided with a particulate filter. The method includes providing data representing engine operational conditions for the internal combustion engine during the intended drive cycle, wherein the data comprises values for at least engine speed and engine torque distributed over a time period representing the intended drive cycle; determining a working temperature for the exhaust gas aftertreatment system during the intended drive cycle based on the data representing the engine operational conditions; providing a reference relation between working temperature of the exhaust gas aftertreatment system and a corresponding estimated magnitude of a build-up of soot in the exhaust gas aftertreatment system; and predicting soot build-up in the engine system when operating according to the intended drive cycle by comparing the determined (Continued)

working temperature for the exhaust gas aftertreatment system with the reference relation.

12 Claims, 2 Drawing Sheets

(56) References Cited

U.S. PATENT DOCUMENTS

| | | | |
|---|---|---|---|
| 2012/0031080 A1* | 2/2012 | Barasa | F01N 3/0253 60/285 |
| 2012/0083965 A1* | 4/2012 | Nevin | F01N 11/002 701/29.4 |
| 2013/0125529 A1* | 5/2013 | Ardanese | F01N 9/002 60/274 |
| 2014/0123608 A1* | 5/2014 | Sun | F02D 41/1467 73/23.33 |
| 2015/0198076 A1 | 7/2015 | Li et al. | |
| 2015/0252699 A1* | 9/2015 | Catalogna | F01N 3/023 60/274 |
| 2017/0234786 A1* | 8/2017 | Weber | G01M 15/102 73/23.33 |
| 2018/0340785 A1* | 11/2018 | Upadhyay | F01N 9/002 |
| 2019/0078524 A1 | 3/2019 | Suchta et al. | |

* cited by examiner

METHOD FOR PREDICTING SOOT BUILD-UP IN AN ENGINE SYSTEM

TECHNICAL FIELD

The invention relates to a method for predicting soot build-up in an engine system when operating according to an intended drive cycle, wherein the engine system comprises an internal combustion engine and an exhaust gas aftertreatment system provided with a particulate filter.

BACKGROUND

Which type and size of internal combustion engine system that should be selected and used in a certain vehicle or machine application depends, for instance, on the intended drive cycle of that vehicle or machine, i.e. the intended or expected distribution of e.g. engine speed and engine torque/load over time. If the engine is too small it is likely to be operated frequently at a very high load that might lead to considerable wear, and if it is too large it might be operated at a too low load that might lead to oil leakage etc.

For commercial vehicles, such as trucks and buses, the intended drive cycle can often be calculated from known road or route data or from GPS data obtained from a vehicle that already operates along the route intended for a new vehicle for which engine system is to be selected.

For stationary and certain vehicle applications, such as electric generators, crushers and fork lifts, it can be more difficult to calculate the drive cycle and thus more difficult to make a proper selection of engine system. In addition, in such stationary and particular vehicle applications it can be more problematic to perform regeneration of an exhaust gas aftertreatment unit forming part of the engine system, such as a diesel particulate filter (DPF). While DPFs of engine systems of trucks and buses often can be subject to active regeneration during operation of the vehicle or be subject to forced "parked" regeneration without affecting operation time too much, many engine systems in stationary or certain vehicle applications that operate under a drive cycle that leads to generation of large amounts of soot and particles cannot be operated so as to actively regenerate the DPF during operation, which leads to a requirement for frequent forced regeneration, which in turn leads to an unacceptable large downtime for the machine or vehicle in that application.

A purpose of this invention is to provide a method for predicting soot build-up in an engine system when operating according to an intended drive cycle. This can be used for predicting the risk for soot build-up, which in turn can be used for properly selecting internal combustion engine system, not only for stationary and particular vehicle applications of the type mentioned above but also for other applications. The prediction method is useful also for planning a drive cycle for a particular engine system, i.e. an initially intended drive cycle can be adapted or adjusted so as to avoid soot build-up.

SUMMARY

The invention concerns a method for predicting soot build-up in an engine system when operating according to an intended drive cycle, wherein the engine system comprises an internal combustion engine and an exhaust gas aftertreatment system provided with a particulate filter, the method comprising:

(S10) providing data representing engine operational conditions for the internal combustion engine during the intended drive cycle, wherein the data comprises values for at least engine speed and engine torque distributed over a time period representing the intended drive cycle;

(S20) determining a working temperature for the exhaust gas aftertreatment system during the intended drive cycle based on the data representing the engine operational conditions;

(S30) providing a reference relation between working temperature of the exhaust gas aftertreatment system and a corresponding estimated magnitude of a build-up of soot in the exhaust gas aftertreatment system; and (S40) predicting soot build-up in the engine system when operating according to the intended drive cycle by comparing the determined working temperature for the exhaust gas aftertreatment system with the reference relation.

The method allows for predicting the soot build-up in the exhaust gas aftertreatment system (EATS) of the engine system, which allows for prediction of whether the engine system in question will be suitable for the intended drive cycle with regard to soot build-up, i.e. whether the magnitude of soot build-up will be acceptable. What is "acceptable" and what is not may depend on the particular application but typically it would not be acceptable if the magnitude of the soot build-up is so high that it is likely that it would lead to a requirement for frequent forced regeneration of e.g. a diesel particulate filter (DPF) forming part of the EATS. To decide this, one may set a threshold value for the soot build-up, for instance in gram soot per liter of the DPF, and conclude that if the magnitude of the soot build-up is higher than the threshold, the engine system is not suitable for the intended drive cycle.

The method may include determining the suitability of a plurality of engine systems for the intended drive cycle where, for instance, the size/power of the internal combustion engine differs between the different engine systems and where also the design of the EATS may differ. The most suitable engine system can then be selected from this plurality of engine systems.

The method may further include a step of determining whether the engine systems are acceptable with regard to size/power of the internal combustion engine so as to be operated with a suitable load, low fuel consumption, etc. It may, for instance, then turn out that an engine system that seems to be the most suitable with regard to engine size/load would most likely lead to a requirement for frequent regeneration of the DPF, which in turn may lead to that the best overall choice is to select another engine system that is not the most suitable with regard to engine size/load but that is significantly more suitable with regard to soot build-up so that forced regeneration can be avoided.

As to the step of (S10) providing data representing engine operational conditions for the internal combustion engine during the intended drive cycle, the data may be based on real operational data collected from an engine system that has been operated in accordance with the intended drive cycle. If the two engine systems are of the same type and size, i.e. if the engine system for which soot build-up is to be predicted is similar to the engine system from which operational data have been collected, the same engine speed and engine torque values may be used when determining/calculating the working temperature of the EATS or filter. The real operational data may, however, be adapted to the engine system for which soot build-up is to be predicted if, for instance, the engine system for which soot build-up is to predicted is larger than the engine system from which data has been collected. To convert speed and torque from a first engine system to a second engine system that is larger or smaller than the first system, one may relate to a common power output during the drive cycle. The data representing engine operational conditions for the internal combustion engine during the intended drive cycle do not necessarily have to be collected real data but may e.g. be simulated data based on information on the intended drive cycle.

The operational data preferably comprises engine speed and engine torque at different points of time distributed over the total time of the intended drive cycle. Each data point may represent a certain time period element and all time period elements may together add up to the time period of the intended drive cycle so that the entire drive cycle is covered. As an example, the length of the drive cycle may be in the range 1-24 hours and the number of time period elements may be in the range 3600-850 000.

The step of "(S20) determining a working temperature for the exhaust gas aftertreatment system during the intended drive cycle based on the data representing the engine operational conditions" may be carried out by importing the speed and torque engine operational data into an engine system calculation model that is set to simulate the engine system to be evaluated and thereby calculate a number of resulting values, such as a temperature in the EATS, at certain points in time over the drive cycle.

As to the calculations for determining the working temperature of the EATS, it can generally be said that this can be done in various ways and that an engine system calculation model can be used. Such models may be more or less complex. The principles of an example of a useful model involving both look-up tables and thermodynamic simulation are described further below.

The working temperature of the EATS may be obtained in different ways. A suitable way is to calculate the temperature at each data point/time period element and then calculate an average temperature from all the data points over the intended drive cycle. This average temperature can be used as the working temperature of the EATS. Further, to predict the soot build-up even better, it is useful to calculate the (average) temperature in a particular EATS unit, such as a diesel particulate filter. As an example one may calculate the temperature upstream and downstream the filter for each time period element and use the average of the upstream and downstream temperatures to obtain the temperature for the corresponding time period element, which temperature then can be used for calculating the average temperature over the entire drive cycle, which then is used as the working temperature. As another example, one may calculate and use only the temperature downstream the filter for each time period element.

As to the step of (S30) "providing a reference relation between working temperature of the exhaust gas aftertreatment system and a corresponding estimated magnitude of a build-up of soot in the exhaust gas aftertreatment system", this is preferably done in advance so that when the working temperature for the engine system in question has been calculated, the corresponding estimated magnitude of soot build-up can be quickly obtained. Although this relation may rely on calculated/simulated data, it is more reliable to make use of a relation based on measured data.

To obtain such measured data, various engine systems provided with particulate filters may be subject to tests where the engine systems are operated according to different drive cycles and where the temperature is measured in the filter (or e.g. downstream the filter) so as to allow calculation of the working temperature of the EATS filter for each engine system as described above. The engine systems may be allowed to operate for a relatively long time, maybe up to 100 hours, so that it can be concluded whether the soot build-up in the long run will stay below a certain maximum level or not (where a soot build-up above the threshold indicates a likelihood that frequent forced regeneration will be necessary). After having operated the engine systems during a sufficiently long time, the amount/weight of soot in the filter after each test (i.e. each particular engine system operated according to a particular drive cycle) can be determined. This provides a relation between the measured working temperature of the tested exhaust gas aftertreatment system and the corresponding magnitude (weight) of the build-up of soot in the tested exhaust gas aftertreatment system. In short, these data provide a reference relation between working temperature and soot build-up.

Although the soot build-up reference data might be scattered and not provide a strict mathematical function, a relation is provided between the working temperature of the exhaust gas aftertreatment system and a corresponding estimated magnitude of a build-up of soot in the exhaust gas aftertreatment system. So, when the working temperature for the engine system in question has been determined in step S20, the reference relation can be used in step S40 to predict the estimated soot build-up, which can be further used to determine whether the determined working temperature for the exhaust gas aftertreatment system results in a build-up of soot that is acceptable. The reference test data may be divided in different groups depending on e.g. size or power of the tested engine system in order to provide data better adapted to the size or power of the engine system to be evaluated so as to improve the soot build-up estimation. As mentioned above, what is "acceptable" and what is not may depend on the particular application but typically it would not be acceptable if the predicted magnitude of the soot build-up is so high that it is likely that it would lead to a requirement for frequent forced regeneration of e.g. a diesel particulate filter (DPF) forming part of the EATS. To decide this, one may set a threshold value for the soot build-up, for instance in gram soot per liter of the DPF, and conclude that if the magnitude of the soot build-up is higher than the threshold, the engine system is not suitable for the intended drive cycle.

In an embodiment, the data representing engine operational conditions during the intended drive cycle are based on real engine operational data collected during a drive cycle corresponding to the intended drive cycle. That the operational data fully or partly are based on or form real (measured) data improves the reliability of the method.

In an embodiment, the determined working temperature for the exhaust gas aftertreatment system is an average working temperature obtained from a plurality of time period elements, each of which forming part of the time period representing the intended drive cycle. The temperature may be calculated for all data points representing the intended drive cycle and the time period elements may together add up to the entire time period representing the intended drive cycle.

In an embodiment, the working temperature refers to a temperature at or in the particulate filter. The soot build-up typically refers to soot build-up in the particulate filter.

In an embodiment, the reference relation between the working temperature of the exhaust gas aftertreatment system and the corresponding estimated magnitude of the build-up of soot in the exhaust gas aftertreatment system is obtained from measurements of temperature and soot build-up during or after operation of at least one engine system. As mentioned above, such measured data, as compared to simulated data, provides for a more accurate estimation of the soot build-up in the exhaust gas aftertreatment system of the engine system for which soot build-up is to be predicted.

In an embodiment, the method comprises the step of determining suitability of the engine system for the intended drive cycle, and further comprising determining whether the engine system is suitable for the intended drive cycle with regard to the build-up of soot in the exhaust gas aftertreatment system.

In an embodiment, the method comprises: obtaining the estimated magnitude of soot build-up in the exhaust gas aftertreatment system corresponding to the determined working temperature; comparing the estimated magnitude of soot build-up with a threshold value; and determining, based on whether the estimated magnitude of soot build-up is above or below the threshold value, whether the engine system is suitable for the intended drive cycle with regard to the build-up of soot in the exhaust gas aftertreatment system.

The threshold can be set in different ways depending on the circumstances. As an example, for a particular engine system comprising a certain DPF, the threshold might be set to 10 g soot per liter of the DPF. That is, if the predicted soot build-up estimation is 9 g or lower, it is likely that using that particular engine system for the intended drive cycle would not lead to the requirement of frequent forced regeneration, and therefore it can be determined that that particular engine system indeed is suitable. On the other hand, if the predicted estimation is 11 g or more soot per liter of the DPF, that particular engine would not be suitable.

In an embodiment, the method comprises: determining suitability of a plurality of engine systems for an intended drive cycle, wherein each engine system comprises an internal combustion engine and an exhaust gas aftertreatment system provided with a particulate filter, and wherein the internal combustion engine and/or the exhaust gas aftertreatment system differ(s) between the plurality of engine systems; and comparing the suitability of the plurality of engine systems with regard to the build-up of soot in the exhaust gas aftertreatment system.

In an embodiment, the internal combustion engine is of the compression-ignition type, such as a diesel engine.

The invention also concerns computer-implemented inventions:
A computer program product comprising program code means for performing the steps above when said program is run on a computer.
A computer readable medium carrying a computer program comprising program code means for performing the steps above when said program product is run on a computer.
A control unit for controlling a method for predicting soot build-up in an engine system when operating according to an intended drive cycle, the control unit being configured to perform the steps of the method according to above.

BRIEF DESCRIPTION OF THE DRAWINGS

With reference to the appended drawings, below follows a more detailed description of embodiments of the invention cited as examples.

DETAILED DESCRIPTION OF EXAMPLE EMBODIMENTS OF THE INVENTION

Figure 1:
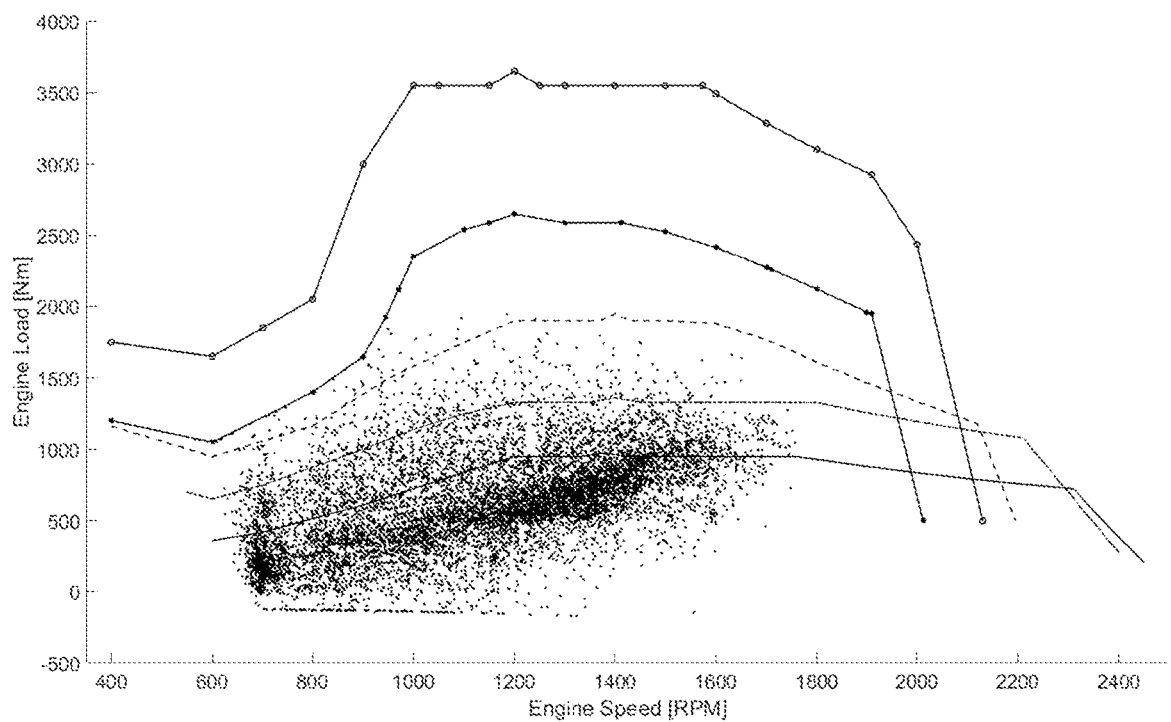
FIG. 1 shows a plot of data representing engine operational conditions during an intended drive cycle.

FIG. 1 shows a plot of data representing engine operational conditions during an intended drive cycle. Each data point shows engine speed and engine torque at a certain time period element of the entire drive cycle time period.

The different lines in FIG. 1 indicate full-load curves for different engine systems of different size where the uppermost line represents the largest engine and the lowest line represents the smallest engine. As indicated in FIG. 1, the largest engine seems to be unnecessarily large, it will have to operate with a load that probably is too low for the intended drive cycle, whereas the smallest engine is too small, although it might be sufficient for an average load/torque it cannot provide sufficient torque for a great portion of the time period elements of the intended drive cycle. FIG. 1 thus indicates suitability of various engine systems for an intended drive cycle based on engine speed and engine load, but it does not include suitability with regard to EATS performance.

Figure 2:
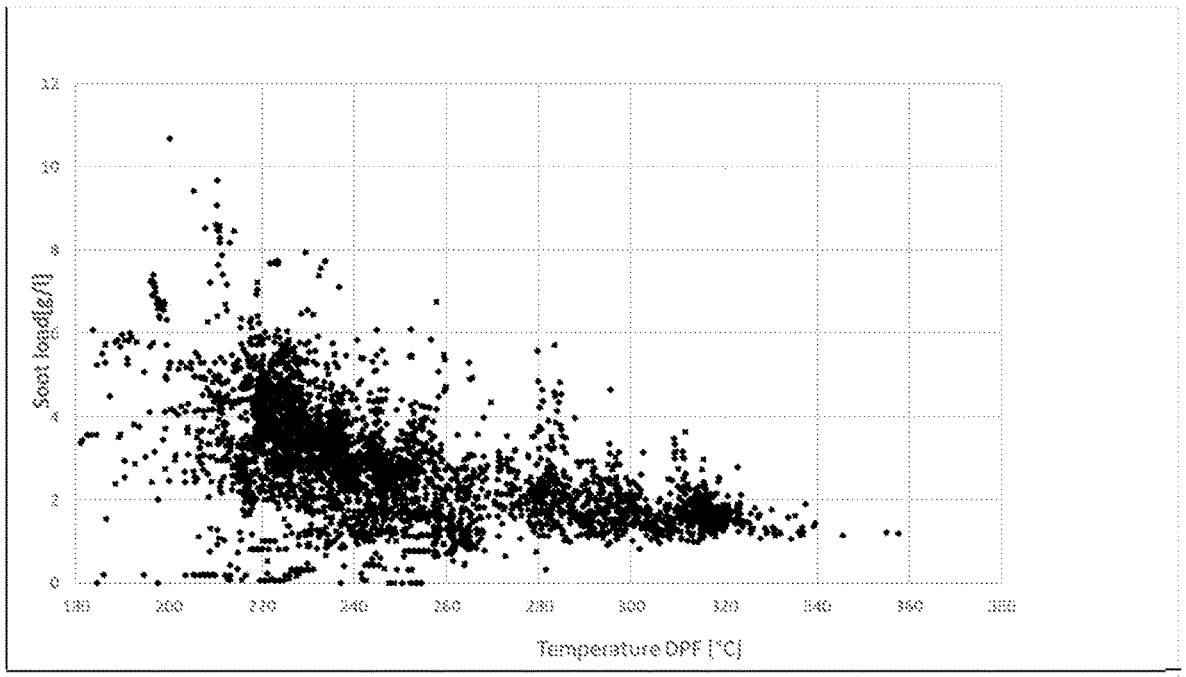
FIG. 2 shows a relation between a working temperature of a diesel particulate filter (DPF) and a corresponding estimated magnitude of a build-up of soot in the DPF.

FIG. 2 shows a reference relation between a working temperature of a diesel particulate filter (DPF) and a corresponding estimated magnitude of a build-up of soot in the DPF. The data points originate from tests and measurements of various engine systems as described further above. For the particular engine systems tested it can be seen from FIG. 2, for instance, that the soot build-up does not exceed 11 g/L (within the temperature range shown), that a DPF working temperature of at least 220° C. leads to a soot build-up of less than 8 g/L, that at least 260° C. leads to a soot build-up of less than 6 g/L, and that at least 300° C. leads to a soot build-up of less than 4 g/L. A certain threshold value may be set for the soot build-up depending on the particular engine system in question, i.e. a threshold that can be used as follows: if the resulting soot load/build-up after a long time of operation is below the threshold, there is a small risk that it will be required to subject the DPF to frequent forced regeneration. FIG. 2 shows only an example, the relation between DPF working temperature and the corresponding estimated magnitude of a build-up of soot may differ between different engine systems.

As can be seen in FIG. 2, if the working temperature of the DPF is determined to be, for instance, around 220° C., the predicted soot build-up will in this case be below 8 g/L. If the soot build-up threshold is set to e.g. 9 g/L, the predicted value is below the threshold, and if the soot build-up threshold is set to e.g. 7 g/L, the predicted value is above the threshold. Accordingly, if one determines/calculates a working temperature of a DPF in the EATS of an engine system (for which the suitability is to be determined) to be higher than 220° C., and if the soot build-up threshold has been set to some value above 8 g/L, that engine system may be considered to be suitable with regard to soot build-up for the intended drive cycle.

Figure 3:
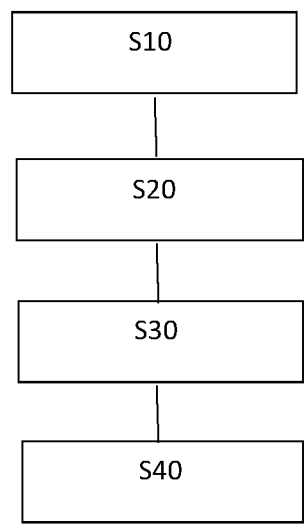
FIG. 3 shows, schematically, an illustrated of a method according to this disclosure.

An example of the method of this disclosure is schematically illustrated in FIG. 3 and may be described as follows:
S10—providing data representing engine operational conditions for the internal combustion engine during the intended drive cycle, wherein the data comprises values for at least engine speed and engine torque distributed over a time period representing the intended drive cycle An example of such data is shown in FIG. 1. The data may be obtained by collecting operational data from an existing (old) engine system used presently in some application, where the intention is to replace the existing engine system for a new engine system (for which soot build-up is to be predicted).

S20—determining a working temperature for the exhaust gas aftertreatment system during the intended drive cycle based on the data representing the engine operational conditions.

The principles of an example for how to carry out step 20 can be described as follows:

Data points as exemplified in FIG. 1 form input data to a calculation model, i.e. data on engine speed and engine torque at different points of time of the intended drive cycle. Exhaust gas temperature and exhaust gas mass flow rate downstream a turbocharger turbine of the engine system subject to the calculations are obtained from look-up tables. The look-up tables are obtained from operation of the engine system at all engine speeds from idling to maximum speed and at all loads from zero to maximum load. (This operation may be done in a previous phase, such as when developing the engine.) Two alternative look-up tables are used depending on the operating mode of the engine, one table for cool EATS and one for warm/hot EATS. Which table to use depends on the simulated EATS temperature at that point in time. The EATS is assumed to be cool when starting the engine.

The data on exhaust gas temperature and mass flow rate obtained for a certain point of operation are then fed to a numerical model of a pipe extending between the turbine and the EATS. The numerical model provides for a delay of any temperature change and also a decrease of temperature due to heat conduction away from the pipe. Downstream the pipe, a diesel oxidation catalyst (DOC) and a DPF are thermodynamically simulated as thermal inertia. A further numerical model simulates a further pipe and downstream that further pipe an SCR-unit (selective catalytic reduction) may be simulated in a similar way as the DOC and the DPF. The calculated temperature of the outgoing exhaust gas is used to select look-up table for the next operational data point (i.e. the next time period element).

An output from these calculations is the temperature in (or downstream) the DPF for each operational data point. To obtain the "working temperature for the exhaust gas aftertreatment system during the intended drive cycle", it is possible to, for instance, calculate an average of the temperature at the DPF and use that average value as the working temperature.

S30—providing a reference relation between working temperature of the exhaust gas aftertreatment system and a corresponding estimated magnitude of a build-up of soot in the exhaust gas aftertreatment system.

This is what is provided in FIG. 2; a certain working temperature of the DPF (that forms part of the EATS) yields a corresponding approximate magnitude of a build-up of soot in the DPF. Step S30 may be carried out before step S10.

S40—predicting soot build-up in the engine system when operating according to the intended drive cycle by comparing the determined working temperature for the exhaust gas aftertreatment system with the reference relation.

Step S40 may include taking the working temperature obtained in step S20, comparing with data corresponding to the example data in FIG. 2, and determining whether this leads to a soot build-up that is less or more than a set threshold. As an example, a magnitude of 8 g soot per liter of the DPF may be set as a threshold so that the threshold for the working temperature becomes 220° C. as described above. Step S40 may then include determining whether the working temperature obtained in step S20 is higher or lower than 220° C. If the working temperature is higher than 220° C. and the threshold is set to 8 g/L, it can be determined that the build-up of soot is acceptable and that the engine system in question is suitable for the intended drive cycle with regard to the build-up of soot in the exhaust gas aftertreatment system.

Several potentially suitable engine methods may be tested so that the method may include the steps of determining suitability of a plurality of engine systems for the intended drive cycle, wherein each engine system comprises an internal combustion engine and an exhaust gas aftertreatment system, and wherein the internal combustion engine and/or the exhaust gas aftertreatment system differ(s) between the plurality of engine systems. Such a method may also include the step of comparing the suitability of the plurality of engine systems with regard to the build-up of soot in the exhaust gas aftertreatment system. To make the comparison, it is possible to illustrate the suitability of the different engine systems in different ways.

It is to be understood that the present invention is not limited to the embodiments described above and illustrated in the drawings; rather, the skilled person will recognize that many changes and modifications may be made within the scope of the appended claims.

For instance, besides using the prediction method for determining suitability of an engine system, the prediction method may be used for planning a drive cycle for a particular engine system so as to avoid a too large soot build-up. For instance, the prediction method may indicate that an initially intended drive cycle will result in a soot build-up that is unacceptable. Different adjustments of the engine operational data may then be made with the purpose of increasing the working temperature of the EATS/filter (while still operating the engine in a manner suitable for its application). The prediction method may then indicate that one or more of the adjusted operational data results in an acceptable soot build-up.

The invention claimed is:

1. Method for predicting soot build-up in an engine system when operating according to an intended drive cycle, wherein the engine system comprises an internal combustion engine and an exhaust gas aftertreatment system provided with a particulate filter, the method comprising:
providing data representing engine operational conditions for the internal combustion engine during the intended drive cycle, wherein the data comprises values for at least engine speed and engine torque distributed over a time period representing the intended drive cycle;
determining a working temperature for the exhaust gas aftertreatment system during the intended drive cycle based on the data representing the engine operational conditions;
providing a reference relation between working temperature of the exhaust gas aftertreatment system and a corresponding estimated magnitude of a build-up of soot in the exhaust gas aftertreatment system; and
predicting soot build-up in the engine system when operating according to the intended drive cycle by comparing the determined working temperature for the exhaust gas aftertreatment system with the reference relation.

2. Method according to claim 1, wherein the data representing engine operational conditions during the intended drive cycle are based on real engine operational data collected during a drive cycle corresponding to the intended drive cycle.

3. Method according to claim 1, wherein the determined working temperature for the exhaust gas aftertreatment system is an average working temperature obtained from a plurality of time period elements, each of which forming part of the time period representing the intended drive cycle.

4. Method according to claim 1, wherein the working temperature refers to a temperature at or in the particulate filter.

5. Method according to claim 1, wherein the reference relation between the working temperature of the exhaust gas aftertreatment system and the corresponding estimated magnitude of the build-up of soot in the exhaust gas aftertreatment system is obtained from measurements of temperature and soot build-up during or after operation of at least one engine system.

6. Method according to claim 1, wherein the internal combustion engine is of the compression-ignition type.

7. A computer program product comprising program code for performing the steps of claim 1 when said program is run on a computer.

8. A computer readable medium carrying a computer program comprising program code for performing the steps of claim 1 when said program product is run on a computer.

9. A control unit for controlling a method for predicting soot build-up in an engine system when operating according to an intended drive cycle, the control unit being configured to perform the steps of the method according to claim 1.

10. Method according to claim 1, wherein the method comprises the step of determining suitability of the engine system for the intended drive cycle, and further comprising determining whether the engine system is suitable for the intended drive cycle with regard to the build-up of soot in the exhaust gas aftertreatment system.

11. Method according to claim 10, wherein the method comprises:
    obtaining the estimated magnitude of soot build-up in the exhaust gas aftertreatment system corresponding to the determined working temperature;
    comparing the estimated magnitude of soot build-up with a threshold value; and
    determining, based on whether the estimated magnitude of soot build-up is above or below the threshold value, whether the engine system is suitable for the intended drive cycle with regard to the build-up of soot in the exhaust gas aftertreatment system.

12. Method according to claim 10, wherein the method comprises
    determining suitability of a plurality of engine systems for an intended drive cycle, wherein each engine system comprises an internal combustion engine and an exhaust gas aftertreatment system provided with a particulate filter, and wherein the internal combustion engine and/or the exhaust gas aftertreatment system differ(s) between the plurality of engine systems; and
    comparing the suitability of the plurality of engine systems with regard to the build-up of soot in the exhaust gas aftertreatment system.

* * * * *